United States Patent [19]

Marino et al.

[11] 4,418,086

[45] Nov. 29, 1983

[54] EXPANDED TEXTURED PROTEIN PRODUCT AND METHOD FOR MAKING SAME

[75] Inventors: Richard P. Marino, Bedford Hills; Richard J. Rothamel, Ossining, both of N.Y.; William C. Rieken, Jackson, N.J.

[73] Assignee: General Foods Corporation, White Plains, N.Y.

[21] Appl. No.: 343,603

[22] Filed: Jan. 28, 1982

[51] Int. Cl.$^3$ .............................. A23L 1/31; A23J 3/00
[52] U.S. Cl. .................................... 426/302; 426/331; 426/623; 426/641; 426/656; 426/657; 426/805
[58] Field of Search .............. 426/641, 656, 657, 802, 426/805, 104, 302, 331, 623

[56] References Cited

U.S. PATENT DOCUMENTS

| | | | |
|---|---|---|---|
| 3,623,885 | 11/1971 | Hamdy | 426/802 X |
| 3,745,021 | 7/1973 | Middlesworth et al. | 426/805 X |
| 3,857,968 | 12/1974 | Haas et al. | 426/805 X |
| 3,968,269 | 7/1976 | Payne et al. | 426/802 X |
| 4,031,267 | 6/1977 | Berry et al. | 426/802 X |
| 4,190,679 | 2/1980 | Coffee et al. | 426/805 X |

*Primary Examiner*—Robert A. Yoncoskie
*Attorney, Agent, or Firm*—Thomas R. Savoie; Daniel J. Donovan

[57] ABSTRACT

An expanded protein product is made by extruding a mix containing a proteinaceous material, an animal or vegetable fat, a non proteinaceous and non-farinaceous extrusion agent, sulfur and/or sulfur compound, plasticizers and water from a high pressure zone to a low pressure zone preferably followed by rehydration of the extrudate.

2 Claims, No Drawings

EXPANDED TEXTURED PROTEIN PRODUCT AND METHOD FOR MAKING SAME

The present invention is concerned with the production of porous hydratable protein food products having a texture and appearance similar to the muscle and tissue protein found in meats or fowl. More particularly this invention relates to a method for producing a fat containing expanded proteinaceous composition by working and heat extrusion of a mixture of proteinaceous material, fat, a non-proteinaceous and non-farinaceous extrusion agent, sulfur and/or a sulfur compound, plasticizer and water.

There is a major effort in the world today to produce nutritious, protein meat substitute products for both animal and human consumption. A significant effort has been directed toward the utilization of protein flours and meals derived from oil seed such as soy beans, peanuts, cottonseeds, and the like as raw materials in the production of said products. Recent developments in this area have focused on the production of meat-like protein products produced by extrusion or otherwise heat treating soy protein. For example, U.S. Pat. No. 3,537,859 discloses a method for preparing protein food products simulating bacon in texture by extruding a homogeneous mixture of defatted soy meal, fat, water and flavoring. The extrudate is characterized as non-expanded and contains entrained moisture and fat. U.S. Pat. No. 3,488,770 deals with a method for preparing an unexpanded porous protein food product having an open cell structure wherein a mixture comprising defatted soy meal and water is masticated at temperatures above about 250° F. and extruded from a zone of high pressure into a zone of lower pressure. The product is characterized as having a meat-like fibrous structure when hydrated. U.S. Pat. No. 3,496,858 discloses the preparation of an expanded protein product similar to the above except sulfur or a sulfur compound is added to the defatted soy meal prior to extrusion. These sulfur additives chemically interact with the protein molecules during processing giving rise to an extrudate having a high degree of expansion and very desirable fibrous structure.

Protein processed according to the teachings of the latter two patents discussed above does indeed have a texture and fibrous structure closely resembling meat. However, most meat products such as beef, poultry, lamb and pork contain a fat content varying from about 5% to 30% or more depending on the type and cut of meat. Much of this fat remains in the meat even after cooking and it is this fat which contributes to the smooth texture, nutrition, juicyness and pleasing organoleptic qualities associated with good quality cooked meats. Thus it would be most desirable to produce a simulated meat product based on expanded proteinaceous materials which contains a certain amount of fat or oil in intimate association with the fibrous protein structure of the expanded protein.

Prior art workers have discovered that the presence of significant amounts of a fat or oil in the proteinaceous material to be extruded severly interferes with expansion of the extrudate and the formation of fibrous structure. As a result, it is recommended that the protein material be substantially free of oil and that no fat be added to the proteinaceous material prior to extrusion.

It has been suggested by the prior art that fat or oil may be combined with the expanded proteinaceous meat substitute after extrusion by coating, impregnating or otherwise infusing the material with a liquid fat. Note, for example, British Pat. No. 1,225,557. However, it is most difficult by such techniques to obtain the intimate association of protein and carbohydrate as is found in real meat products, and the fat will often settle out within short periods of time severly detracting from product palatability.

Two methods of overcoming some of the problems of the prior art is taught in U.S. Pat. No. 4,031,267 to Berry et al and U.S. Pat. No. 3,480,442 to Atkinson. However, essential to producing an expanded and textured protein product is the requirement of having a protein content of at least 30% by weight. This level of protein permits the formation of a porous expanded and texturized proteinaceous material. One of the disadvantages of these products, is its requirement of high protein materials. Thus, the product is very costly. Another disadvantage of the processes taught is the products produced from the extruder are not full feeding products. That is the products are not nutritionally balanced as produced and requires further processing to make the products a full feeding nutritionally balanced food.

Other methods of producing a textured pet food include U.S. Pat. No. 4,190,679 to Coffee et al. This patent teaches a dry pet food in combination with an intermediate moisture food product.

Still other methods of producing an unexpanded extrusion vegetable protein based meat analogue is taught in U.S. Pat. No. 4,042,715 to Wenger et al. This unexpanded product is quite dense in structure and is not a preferred meat-like texture. The resultant product does not mimic choice meat but rather is more like meat grissle. Moreover, the process requires an undesirable hydration process.

Other attempts at providing an expanded, textured, soft moist food product is taught in British Pat. No. 1,583,644 to Turton et al.

Within the art, it is well known that when producing products having intermediate moisture contents, to achieve bacteriological stability while maintaining the soft and moist characteristics of the product, one has to employ specific levels of sugars, plasticisers such as polyhydric alcohols, antimycotics, food acids and salts in amounts sufficient to stabilize the foodstuff but without being detrimental to the nutritional requirements and acceptability to the pet. It is further known in the art that when producing expanded textured vegetable proteins, the presence of such sugars, plasticisers, antimycotics, acids and salts in sufficient quantities to stabilize an intermediate moisture food, impedes, if not completely prevents, the texturization of the vegetable protein into a texture analogous to that of meat. Furthermore, it is known to those skilled in the art of producing pet foods that textured vegetable proteins, as exemplified by textured soya protein, are not highly palatable to pets.

It is further known within the art that enzymatically digested meat, meat offals or meat by-products are particularly palatable to pets. Until now the use of such digested products has been restricted to use in dry pet foods as coatings or as an integral part of the pet food before being extruder expanded.

SUMMARY OF INVENTION

It has now been found that an expanded protein product containing up to about 35% by dry weight of a fat or oil can be prepared by forming a mixture comprising a proteinaceous material, fat or oil, and farinaceous material, plasticizer, sulfur and/or sulfur compound and water. The expanded product having a meat-like texture is prepared by subjecting the mix to heat and mechanical working such as in a cooker-extruder, and extruding the composition from a zone of higher pressure into a zone of lower pressure.

As indicated hereinabove, it had previously been the experience of prior art workers that the presence of significant amounts of a fat or oil in a proteinaceous composition prior to extrusion severly inhibits the expansion and texturization of the protein such that a porous product having a meat like texture when hydrated cannot be prepared. By means of the present invention it is now possible to prepare expanded protein product containing significant amounts of a fat or oil in intimate association with the protein molecules, which product not only texturally resembles meat, but also has a smoother, moist fatty feed inherent in genuine meat products.

It is an object of the present invention to provide a process for preparing an economical textured pet food in the form of a soft, moist, textured, resilient, meat-like chunks of relatively high palatability. The process of this invention provides for the texturization of a full feeding nutritionally balanced pet food without the necessity of resorting to infusing of nutritional supplements and stabilizers. The product of this invention is a cohesive, resilient, fibrous, expanded, texturized product which very closely resembles natural meats.

DETAILED DESCRIPTION

The textured product is achieved in the preferred embodiment by processing a mixture comprising a proteinaceous matrix, fat or oil, sulfur and or sulfur compound, farinaceous material, plasticizer, and water.

In preparing the product of this invention, the ingredients are blended prior to introduction into the extruder or in the extruder itself. The mix, as it is moved progressively forward in the extruder will be subject to shear forces, mechanical work, heat and pressure such that the product temperature prior to discharge is at least 280° F. The pressure and some of the heat is generated as a result of the progressive advancement of the product in the extruder screw chamber against a restricted orifice at the discharge section of the chamber and also by internal frictional forces. Pressure and temperature can be varied by altering the screw configuration, screw speed, the size of the die extruding the composition in the manner hereinabove described.

The amount of sulfur or sulfur compound employed in preparing the expanded proteinaceous material will vary depending upon the amount protein present in the source material, the nature of the sulfur compound and the degree of expansion desired. In general, sulfur or sulfur compounds may be added in the range of 0.01% to 2.5% by weight of the composition to be extruded. Preferred levels range from 0.1% to 0.6% by weight. Typical sulfur containing materials which aid in the preparation of the expanded porous proteinaceous material of this invention are elemental sulfur, and sulfur compounds such as cysteine, cystine, methionine, lower alkyl mercaptans and the like. It is preferred to use elemental sulfur.

The proteinaceous materials should provide both nutritional and functional characteristics. Thus, not only is it necessary as a practical matter of pet nutrition to provide the proper balance of protein necessary for a full-feeding food, but is also necessary for the proteins to function properly under processing conditions to provide the desired chewy, resilient, meat-like texture.

The proteinaceous admixture can contain from about 25% to 45% protein by weight. Preferably the admixture will contain from 28% to 35% protein by weight. Whereas the prior art has heretofore required larger amounts of protein for texturization, it has been found that the present process does not require it.

Suitable as proteinaceous materials according to this invention are proteinaceous meaty materials and vegetable protein sources, as well as, if required, ration-balancing proteins. The term "proteinaceous meaty material" refers to the group consisting of meat, meat by-products and meat meal as well as mixtures of these. The term "meat" is understood to apply not only to the flesh of cattle, swine, sheep and goats, but also horses, whale and other mammals, poultry and fish. The term "meat by-products" is intended to refer to those non-rendered parts of the carcass of slaughtered animals including but not restricted to mammals, poultry and the like and including such constituents are embraced by the term "meat by-products" in the Definitions of Feed Ingredients published by the Association of American Feed Control Officials, Incorporated. Likewise, the term "meat meal" refers to the finely ground, dry rendered residue from animal tissues including those dried residues embraced by the term in the aforesaid official definition of the Association of American Feed Control Officials, Incorporated. Indeed, the terms "meat", "meat by-products," and "meat meal" are understood to apply to all of those animal, poultry and marine products defined by said associattion.

The term "vegetable protein source or concentrate" applies to oil seeds and legumes; as well as the oil expressed or extracted meals and cakes and protein isolates and concentrates thereof recovered by known procedures including acid or alkali digestion and precipitation; typical of such vegetable protein sources are soybeans, soybean meal, cotton seed meal, alfalfa protein, peanuts, peanut meal, etc., all of which terms are well understood and similarly defined or understood by said association.

Other protein source material such as peanuts, cottonseeds, meat meal, fish meal and the like may be similarly de-oiled and the oil replaced with any animal or vegetable fat desired. This is a particularly advantageous procedure where it is desired to replace saturated fats found in meat protein with unsaturated vegetable oil.

In those cases in which a high protein content food is desired, wherein the protein content is greater than 45% by weight, a ration-balancing protein supplement may be added. This may have particular application when producing a pet food especially formulated for growing pets whose nutritional requirements necessitate a high level of protein for growth and development. The term "ration-balancing protein supplement" is intended principally to refer to milk products as defined by said association and hence includes such additives as dried buttermilk, dried skimmed milk, dried whole whey, casein and cheese rind, although it also includes yeast as that term is defined by said association and hence refers to such materials as distillers' dried yeast, primary dried yeast, irradiated dried yeast, brewers' dried yeast and torula dried yeast. However, the term protein supplements is not to be understood as restricted to the aforesaid definition and includes such things as single cell protein and the like.

While economy products containing no fresh meat are within the scope of this invention preferably, the product will contain at least 10% and up to about 40% fresh meat of the total composition. Preferably, soy flour or other like protein source is employed in an amount of from 12% to about 25% of the weight of the total composition.

The fat or oil present in the expanded protein product, hereinafter referred to as fat, may be the fat or oil which is naturally present in the proteinaceous material, or it may be overtly added to the proteinaceous material as will be hereinafter described. Examples of such fats are vegetable oils such as cottonseed oil, soybean oil, peanut oil, coconut oil and the like and animal fats such as tallow, lard, chicken fat, fish oil and the like.

The degree of expansion and texturization of the proteinaceous material of this invention is affected by the amount of fat present in the composition. The amount of fat present in the mixture to be expanded will be greater than 5% by dry weight. Preferably the fat content will be greater than 5% and up to about 35% by weight. Where the amount of fat is significantly higher than about 35% by weight of the composition to be extruded, expansion and texturization is markedly inhibited.

The farinaceous component also provides both nutritional and functional characteristics in the food. Among the suitable farinaceous materials are grains such as corn, wheat, barley, oats, and the like, as well as the normal milling products of these materials such as whole ground wheat, corn flour, and the like. While the farinaceous material can comprise from 0% up to 55% of the total pet food and be derived from a single source, it is preferred, for best nutrition, functionality and economy to employ at least two different farinaceous materials at a combined level of from 1% to 20%. One preferred combination is wheat and corn at a weight ratio of from 3:2 to 2:3.

In addition to these materials, the preferred pet food formulations will also contain vitamin and mineral supplements necessary to provide a full feeding nutritionally balanced food. Additionally, due to the relatively high moisture contents of these foods as opposed to dry foods and the incapability of most of the noted osmotic agents to inhibit all microbial growth, effective levels of antimycotic agents such as potassium sorbate are desirably employed to assure stability against microbial growth.

The dog foods of the present invention are full feeding nutritionally balanced. It is important that each ration be nutritionally complete. Where this can be assured by the manufacturer, it is not necessary for the dog owner to balance the quantities of different foods supplied. The nutritional intake of the dog is then assured so long as it intakes a minimum amount of food. Full feeding nutritionally-balanced foods will contain protein, carbohydrates, fats, vitamins and minerals in amounts established by feeding tests to be sufficient for proper growth and maintenance. The preferred product of this invention will meet the nutritional requirements as set forth in Handbook Number 8, entitled, Nutrient Requirement of Dogs, which is published and amended by the National Research Council of the National Academy of Sciences.

Non-proteinaceous and non-farinaceous finely divided extrusion agent material which functions so as to bind up any fatty glyceride material in the composition are not deemed necessary in the present invention. Thus it has been found that when employing a twin screw expander-extruder the typical extrusion agent such as silicone dioxide, or microcrystalline cellulose may be excluded and still be able to texturize the proteinaceous fat mixture.

It has been found that when approximately 0.2% to 2% by weight of finished product of commercially available extrusion agent is added, processing is facilitated. However, satisfactory results are achieved without this ingredient, but one will need to monitor temperature of the expander-extruder more carefully. Cellulose materials found useful as known extrusion agent include materials sold under the trade name "Avicel". This cellulose material which is generally produced by acid hydrolysis of cellulosic materials, has an average particle size within range of about 0.01 to about 50 microns.

The use of an extrusion agent does result in accentuated fiber formation. The fibers appear to be longer when the extrusion agent is employed. It has been found that when the fibers are longer, a greater control of expansion of the meat piece is possible resulting in a more meat like texture. Moreover, the product has a better cohesiveness than without the extrusion agent. Not suitable as an extrusion agent are the silica acid, solicoaluminetes and carbon black.

To obtain the desired soft, resilient texture and to provide a controlled water activity in the product, a plasticizing is employed at a level of at least 1% to 10%, but preferably from 2% to less than 5% by weight of final product. Suitable for use as the plasticizing agent are any of the normally liquid, edible di-, or tri-hydric alcohols or sugar alcohols or other polyhydric alcohols effective for this purpose. Typical among these are 1,2-propanediol, 1,3-butanediol, glycerol, and mixtures of these. It has been found that due to its highly effective plasticizing effect, and preservation properties, propylene glycol is a preferred material.

In processing these formulations to obtain the unique textural characteristics of the soft, meat-like piece desired according to the present invention, the ingredients are mixed, plasticized under heat and pressure, extruded under conditions which cause expansion and texturization, and cut into chunks. These chunks are then preferably coated with a layer of a palatability improving material such as fat, meat-derived flavors, hydrolyzed vegetable protein, meat slurries and the like.

The ingredients can be mixed in any manner which is effective to provide a sufficiently homogenous blend to permit efficient plasticization in the extruder. In a typical processing arrangement, the ingredients are mixed in a suitable mixing device, such as a ribbon blender. While the resulting mixture may then be fed directly to the extruder for texturization, it is preferred to precondition the blend. In a preferred processing arrangement, the resulting mixture is fed into a steam preconditioning chamber where it is mixed with live steam and sufficient water to maintain the moisture at a level of from about 10% to about 40% to assure the desired final moisture content. A residence time of about 0.25 to 2 minutes is sufficient to cook and adequately plasticize the mixture which will achieve a temperature of from about 150° F. to about 210° F. upon exit.

In a more preferred process, two ingredient streams are prepared. In the first ingredient stream, all the dry ingredients are mixed in a suitable container until an admixture is obtained. In the second ingredient stream, an enzymatically digested slurry of proteinaceous material is obtained. These two streams are combined per the formulation to be extruded. Although all of the formulation that is to be extruded may form an enzymatically digested slurry, it is preferred to only enzymatically digest the proteinaceous meaty materials.

The term "enzymatically digested slurry" refers to the digestion of proteinaceous materials by the addition of a proteolytic enzyme, for example papain bromalin, ficin or other proteolytic enzyme derived from plant, fungal, bacterial or animal gland sources or by the addition of such bacterial or fungal cultures themselves or by the addition of proteolytic enzyme-containing animal glands themselves or as admixtures with any one or more of the aforementioned enzymes or enzyme sources. In addition, the enzymatically digested slurry refers to the digestion of farinaceous ingredients by the use of an amylase enzyme. Among the suitable enzymes are alpha amylase, derived from plants, animals or microorganisms. Preferably a non heat stable bacterial alpha-amylase and fungal alpha-amylase are employed.

Generally the process requirements for a meat enzymatic digestion slurry involve fine comminution of the proteinaceous meaty materials and adjustment of the pH to that most suited for the enzyme or enzyme source employed in the digestion, by the use of acid, alkali or buffer solutions. The pH range is suitably 4.5–10 but is preferably 6–8. Following comminution and pH adjustment, the digest is adjusted to a temperature most suitable for the action of the employed enzyme system within a temperature range of 120° F. to 160° F., but preferably within the range 130° F. to 150° F. The enzyme or enzyme source or mixtures thereof is now added to the comminuted, pH and temperature controlled proteinaceous meaty materials at a level depending on the proteolytic activity of the enzyme or enzyme source employed. The digestion is continued with agitation for 5 minutes to 6 hours until such time as the meat material is sufficiently digested. The digested proteinaceous material is then heated to approximately 170° F. and held at this temperature for 3 minutes to inactivate the enzyme and provide a degree of bacteriological sterilization.

The formulation as prepared above is then fed into a plasticizer-extruder wherein it is further heated and plasticized under pressure. The formula will attain a temperature of at least about 280° F. within the extruder while being subjected to pressures above 100 psig. The upper limit of temperature is determined by the temperature at which the ingredients may undergo undesirable quality degredation. Temperatures of from about 280° F. to about 450° F. are preferred. Even more preferred is a temperature range from 280° F. to 400° F. This plasticization prepares the material for providing a soft, resilient texture upon extrusion and heats the material to such a degree under requisite pressure to assure texturization of the formulation upon exiting the extruder. The moisture content within the extruder is in the range of 15% to 40% by weight.

The pressure drop upon exiting the extruder should be at least about 25 psig, but less than 300 psig. Preferably, the pressure drop upon exiting the extruder will be from about 50 psig to about 200 psig. Formulations having lower moisture contents will need to be subjected to higher pressures within this range, and higher moisture formulations will require the lower pressures within this range. The amount of water used will be sufficient to facilitate processing and yield an extrudate having a moisture content after extrusion and after flashing off of moisture, the moisture content will be about 15% to 30%, and more preferably from about 17% to 25%.

It has been found that the plasticizing-extrusion is most preferable conducted in a twin screw extruder. Typical twin screw extruders have two screws within its extrusion barrel and enable the product matrix to be subjected to a high shear profile. This shear profile serves several functions in providing conditions necessary for texturization. It provides a vigorous mixing pattern where the product matrix is intimately mixed and kneaded. The product matrix is worked between the two screws which may be co-rotating or counter-rotating. Another function provides efficient heat transfer from the jacketed barrel of the extruder. The screw profile further functions to create the necessary residence time within the extruder.

It is important not to over-work or over-shear the product matrix so as to destroy texturization. Thus, the screw profile will contain a feed section, mixing section which contains the necessary elements to mix water into the dough matrix, followed by one or more work zones which contain the necessary elements to shear the dough matrix and raise the dough matrix temperature to the desired temperature range. In the work zone, the major shear and heat transfer will occur. Following the work zone, will be a forming zone which aids in processing control to enhance product formation. Depending upon manufacturer of the twin screw extruder, the screw profiles may vary but the parameters of temperature, residence time, moisture content, and shearing force will remain the same.

The advantage of a twin screw extruder is that it provides positive conveying characteristics allowing the product to be worked in a shorter work zone area than that of a single screw extruder. In the twin screw extruder the product matrix is worked between each screw as well as between the screw and the extruder barrel. In the single screw extruder, the product matrix is only worked between the extruder screw and barrel. As is known to those skilled in the art, the twin screw extruder allows better control of the mechanical work of the product matrix. Typical twin screw extruders are manufactured by Werner Pfleiderer and Creusot Loire. Twin screw extrusion enables production of the product of this invention at production rates much greater than single screw extrusion.

An ideal degree of expansion provides about 1.75 to 2.25 times expansion based on the diameter of the extrudate as compared to the diameter of the die orifice from which it is expressed with acceptable degrees of expansion providing an extrudate being from about 1.50 to 2.75 times the diameter of the orifice. The extrusion conditions will be varied as required to obtain the desired degree of expansion.

The product is severed as it issues from the orifice die face at the end of the extruder. By spacing the cutting blade a small distance from the die face, a pleasing, irregularly-shaped chunk can be obtained due to a ripping action caused by this arrangement. The blade is spaced from about ⅛ inch to about ⅜ inch from the die plate. Preferably, the extrudate forms a continuous rope which is then diced to desired dimensions by a Urshel dicer. The chunks formed show a moderately expanded, meat-like interior with a substantially-continuous, fibrous and highly-irregular surface. When extrudated and cut in the preferred manner, the product shows a bulk density of from 15 to 25 lb/ft$^3$, and is preferably from about 17 to 21 lb/ft$^3$, these densities being necessary to obtain the desired fibrous, resilient, meaty texture and product appearance. The product at this point will have a moisture range of from about 15% to 30%. More preferred the product will have a moisture range of from about 17% to 25% by weight. The $A_w$ of the product at this point will be greater than 0.90.

While the expanded textured protein product at this point will provide a full feeding nutritionally balanced pet food, a coating of material can be applied. Coatings of beef tallow, sprayed on in an amount of from about 2% to about 8% based on the weight of the pet food, have proved to be desirable. Likewise other coatings such as meat meal, meat flavors, gravy formers, and the like can be applied.

In a preferred process, the expanded textured protein product will be coated with a liquid composition applied at a ratio of from about 80 parts expanded product to 20 parts liquid composition to a ratio of from about 65 parts expanded product to 35 parts liquid composition. The liquid composition comprises water, an enzymatically digested slurry, polyhydric alcohol, fat and materials capable of arresting microbial growth. Among these are the low molecular weight materials capable of providing osmotic pressure effects, of the type suggested by Burgess et al in U.S. Pat. No. 3,202,514. This Burgess et al patent is, therefore, incorporated by reference. Of these, sugars and salts are the most preferred; with sugars such as corn syrups and sucrose, and salts such as sodium chloride, being the preferred water activity, $a_w$, lowering materials. It has been found according to the invention that high fructose corn syrups and those having dextrose equivalent, DE, values of from about 30 to 75 are especially desirable ingredients because they not only have an $a_w$ lowering effect, but they also provide a degree of palatability desired by dogs and help to maintain product plasticity. The liquid composition enhances the products' cosmetics and palatability. The resultant moisture will be in the range of from 20% to 35%. Even more preferred the moisture range will be from 25% to 30%. The $A_w$ of the product will be in the range of 0.85 to 0.93. This product has a bulk density of from about 20 to 35 lbs/ft$^3$ and more preferable from 23 to 32 lbs/ft$^3$.

In applications where the expanded vegetable protein material is intended as a meat substitute or extender, it may be desirable for flavor and nutritional purposes to remove some or all of the vegetable oil prior to extrusion by solvent extraction, pressing or other techniques, and replace the oil with an animal fat such as tallow or lard. For example, expanded soy containing 10%, 20% or 35% tallow may be prepared by thoroughly blending de-oiled soy meal with the appropriate amount of tallow in a ribbon mixer or other suitable device, further thoroughly blending this mixture with filler, sulfur or sulfur compound and any other ingredients which are to be included in the composition, and extruding the composition in the manner hereinabove described. Other protein source material such as peanuts, cottonseeds, meat meal, fish meal and the like may be similarly de-oiled and the oil replaced with any animal or vegetable fat desired. This is a particularly advantageous procedure where it is desired to replace saturated fats found in meat protein with unsaturated vegetable oil.

The expanded product of this invention is ideally suited as a partial or total replacement for meat in a multitude of products such as soups or stews, chili-concarni, animal food and the like. Due to the porous nature of the product it is capable of absorbing water or other liquids. When rehydrated, it has the fibrous appearance of meat as well as the fatty feel and smooth texture of meat due to the intimate association of fatty glyceride with the protein fibers. The expanded product may be diced into small pieces and mixed with meat or meat by-products for use as an animal food. The expanded product may also be coated with liquids containing flavorings, preservatives such as sugar or edible glycols, colorants and the like to provide a more palatable and moist appearing product.

The following examples are illustrative of the preferred methods for preparing the expanded products of this invention. It should be kept in mind that methods other than twin screw extrusion such as mechanical milling or pressing or even single screw extrusion which impart mechanical work, pressure and temperature will not be adequate for the production of an expanded proteinaceous composition according to this invention.

EXAMPLES

The following formulations were prepared. All amounts are in parts by weight, unless indicated otherwise.

| | Beef No. 1 | Chicken No. 2 | High Protein No. 3 | Low Protein No. 4 |
|---|---|---|---|---|
| Dry Ingredients | | | | |
| Soy bean oil meal | 24.7 | — | 25.0 | 25.0 |
| Soy flour, fullfat | — | 24.7 | — | — |
| Wheat gluten | 15.8 | 15.8 | 25.0 | 5.0 |
| Wheat flour | 2.2 | 2.2 | 2.2 | 23.0 |
| Vitamins, minerals and flavorings | 3.7 | 3.7 | 3.7 | 3.7 |
| Sulfur | 0.2 | 0.2 | 0.2 | 0.2 |
| Avicel | 0.8 | 0.8 | 0.8 | 0.8 |
| Ingredients to Prepare Slurry | | | | |
| Meats | 10 | — | — | 10.0 |
| Chicken/Poultry | — | 0.02 | — | — |
| Enzymes | 0.02 | 0.02 | — | 0.02 |
| Water | 2.8 | 2.8 | 4.8 | 2.8 |
| Polyhydric alcohol | 3.0 | 3.0 | 3.0 | 3.0 |
| Color, flavors | 0.16 | 0.2 | 0.2 | 0.2 |
| Fat | 3.9 | 3.9 | 10.0 | 3.90 |
| Coating Solution | | | | |
| Corn syrups | 8.3 | 8.3 | 20.0 | 8.3 |
| Meat Slurry | 10.0 | — | — | 10.0 |
| Chicken slurry | — | 10.0 | — | — |
| Polyhydric Alcohol | 3.6 | 3.6 | 3.6 | 3.6 |
| Oil | 0.5 | 0.5 | 0.5 | 0.5 |
| Emulsifier | 0.1 | 0.1 | 0.1 | 0.1 |

The dry ingredients are mixed in a suitable container until an admixture is obtained. Typically the dry ingredients are mixed for 5 minutes in a ribbon blender. The slurry ingredients are separately enzymatically digested. Typically, the meats and water are combined with the enzyme and heated to approximately 140° F. The mixture is allowed to react sufficiently. The mixture is then heated to inactivate the enzymes. Typical inactivation temperature is about 170° F. After inactivation, the remainder of the slurry ingredients are added and mixed. The remaining ingredients include the polyhydric alcohol, color, flavors and fat.

The dry admixture is then combined with the slurry as prepared above, and fed to a steam injected preconditioner where the blend is subjected to vigorous mixing, pre-moistening and pre-heating. The mixture is cooked for approximately ½ minute to a final temperature of about 180° F. to about 210° F. Sufficient water is added during this stage to maintain the moisture content at approximately 16% to 35%.

The formulation as prepared above is then fed into a plasticizer twin screw extruder wherein it is further heated and plasticized under pressure. The formula will attain a temperature of from about 280° F. to 400° F. within the extruder while being subjected to pressures above 100 psig. This plasticization prepares the material for providing a soft, resilient texture upon extrusion and heats the material to such a degree under requisite pressure to assure texturization of the formulaton upon exiting the extruder. The pressure drop upon exiting the extruder will be about 100 psig. The amount of water used will be sufficient to facilitate processing and yield an extrudate having a moisture content of about 20%. The protein content of Extrudate No. 1 is approximately 38% to 40% protein. The protein content of Extrudate No. 2 is approximately 39% to 42%. Extrudates No's 1 through 4, are microbiologically stable, however, it is preferred to coat them with the coating solution.

The extrudate is thereafter coated with the coating solution to provide a moist appearance and increase palatability. The final moisture content will be in the range of from 25% to 30%. The $A_w$ of the product will be in the range of 0.90 to 0.92. This product has a bulk density of from about 24 to 29 lbs/ft$^3$. The protein content of extrudate No. 1 is approximately 27% to 30% while the protein content of extrudate No. 2 is approximately 28% to 31%. Extrudate No.'s 1 through 4 are microbiologically stable.

What is claimed:

1. A method for preparing an expanded, resilient protein product which has an open cellular, fibrous structure, a fat content of at least 5% up to about 35% dry weight basis, and a moisture content of from 15% to 30% by weight. The steps comprising:
   (a) forming a mixture containing, on a weight basis, 10% to 40% fresh meat, 12% to 25% soy flour, 1% to 20% combined wheat and corn, 0.01% to 2.5% elemental sulfur or a sulfur compound, and from 1% to 10% of a polyhydric alcohol plasticizing agent, said mixture being free of any non-proteinacious and non-farinaceous extrusion agent and said mixture containing sufficient water to produce the 15% to 30% moisture content in the expanded product;
   (b) heating the mixture of step (a) to a temperature of above 280° F. while mechanically working the heated mixture at a pressure above 100 psig in a twin screw extruder;
   (c) extruding the mixture from the twin screw extruder such that the mix expands from about 1.75 to 2.25 times in size as compared to the orifice size;
   (d) cutting the extruded material into chunks; and
   (e) coating the chunks with a layer of a palatability improving material.

2. The method of claim 1 wherein the mixture of step (a) is fed into a steam preconditioning chamber where it is contacted with live steam and water before being fed to the twin screw extruder.

* * * * *